United States Patent
Triezenberg

(10) Patent No.: US 9,774,829 B2
(45) Date of Patent: Sep. 26, 2017

(54) DEMAND BASED FIELD OF VIEW (FOV) ALLOCATION FOR REMOTE SENSING SYSTEMS

(71) Applicant: THE BOEING COMPANY, Chicago, IL (US)

(72) Inventor: Bonnie L. Triezenberg, Pacific Palisades, CA (US)

(73) Assignee: THE BOEING COMPANY, Chicago, IL (US)

(*) Notice: Subject to any disclaimer, the term of this patent is extended or adjusted under 35 U.S.C. 154(b) by 131 days.

(21) Appl. No.: 13/963,910

(22) Filed: Aug. 9, 2013

(65) Prior Publication Data

US 2015/0045995 A1    Feb. 12, 2015

(51) Int. Cl.
| | | |
|---|---|---|
| G06K 9/62 | (2006.01) | |
| H04N 7/18 | (2006.01) | |
| G06Q 99/00 | (2006.01) | |

(52) U.S. Cl.
CPC ............ H04N 7/181 (2013.01); G06Q 99/00 (2013.01); H04N 7/18 (2013.01)

(58) Field of Classification Search
USPC .............................. 348/143, 144, 148; 701/3
See application file for complete search history.

(56) References Cited

U.S. PATENT DOCUMENTS

| | | | | |
|---|---|---|---|---|
| 2010/0321473 A1* | 12/2010 | An | ........................ | H04N 5/2628 348/47 |
| 2011/0010025 A1* | 1/2011 | Eu | ......................... | G01S 5/0027 701/2 |
| 2012/0029812 A1 | 2/2012 | Altwaijry et al. | | |
| 2012/0105634 A1* | 5/2012 | Meidan | .............. | G08B 13/1965 348/143 |

FOREIGN PATENT DOCUMENTS

| | | |
|---|---|---|
| WO | 0218874 A1 | 3/2002 |
| WO | 2004070522 A2 | 8/2004 |
| WO | 2006080003 A2 | 8/2006 |
| WO | 2013032823 A1 | 3/2013 |
| WO | 2014039963 A1 | 3/2014 |

OTHER PUBLICATIONS

Combined Search and Examination Report, Application No. GB1413491.0, Feb. 2, 2015.

* cited by examiner

*Primary Examiner* — Adam Tissot
(74) *Attorney, Agent, or Firm* — Vista IP Law Group LLP; Cynthia A. Dixon

(57) ABSTRACT

The present disclosure provides a system, method, and apparatus for collecting sensor data by a remote vehicle. The method involves determining, by at least one first processor, at least one scene to collect by using information in a demand map. The method further involves configuring, by at least one processor, a field of view for at least one sensor associated with the remote vehicle to collect at least one scene. Further, the method involves collecting, by at least one sensor, at least one scene.

21 Claims, 5 Drawing Sheets

DEMAND BASED FIELD OF VIEW (FOV) ALLOCATION FOR REMOTE SENSING SYSTEMS

BACKGROUND

The present disclosure relates to remote sensing systems. In particular, it relates to demand based field of view (FOV) allocation for remote sensing systems. The present disclosure applies to any system that uses sensors hosted on remote vehicles for data collection.

Traditionally, remote sensing vehicle collections are only scheduled in response to an external user request. Typically, users only know that they are interested in a specific scene within the region after an event (e.g., a natural disaster, oil spill, and war) has occurred. While it is the change in the scene that is of value to the users, the traditional approach limits the probability that the system will have high quality "before" data of the region of interest in its inventory to compare against the current data. Therefore, there is a need for a solution to provide a demand based field of view (FOV) allocation for remote sensing systems to provide high quality "before" data.

SUMMARY

The present disclosure relates to a method, system, and apparatus for demand based field of view (FOV) allocation for remote sensing systems. In one or more embodiments, a method is disclosed for collecting sensor data by a remote vehicle. The disclosed method involves determining, by at least one first processor, at least one scene to collect by using information in a demand map. The method further involves configuring, by at least one first processor, a field of view for at least one sensor associated with the remote vehicle to collect at least one scene. Further, the method involves collecting, by at least one sensor, at least one scene.

In one or more embodiments, at least one scene comprises image data for at least one region. In at least one embodiment, the remote vehicle is a manned vehicle or an unmanned vehicle. In some embodiments, the remote vehicle is an airborne vehicle, a terrestrial vehicle, or a marine vehicle. In one or more embodiments, the airborne vehicle is a satellite, a pseudo satellite, a space plane, an aircraft, a helicopter, or an airplane. In at least one embodiment, the terrestrial vehicle is an automobile, a rover, or a train. In some embodiments, the marine vehicle is a submarine, a ship, or a boat.

In at least one embodiment, at least one first processor is associated with the remote vehicle. In some embodiments, the information in the demand map is related to market demand for at least one region. In one or more embodiments, the method further involves generating, by at least one first processor, the demand map according to market demand. In some embodiments, the method further involves determining, with at least one first processor, the market demand by using market conditions, where the market conditions are based on current news and events, user requests for data for at least one region, scarcity of data for at least one region, and/or staleness of data for at least one region.

In one or more embodiments, the method further involves sending at least one scene to an inventory system. In some embodiments, the method further involves determining, by at least one first processor, market demand for data for at least one region by reviewing contents of the inventory system; and generating, by at least one first processor, the demand map according to the market demand when at least one first processor determines that data for at least one region contained in the inventory system is older than a threshold period of time (e.g., one (1) day).

In at least one embodiment, method further involves determining, by at least one first processor, market demand for data for at least one region by reviewing contents of the inventory system; and generating, by at least one first processor, the demand map according to the market demand when at least one first processor determines that data for at least one region is not contained in the inventory system.

In one or more embodiments, the method further involves receiving, by the remote vehicle, the demand map. In some embodiments, the method further involves generating, with at least one second processor, the demand map. In at least one embodiment, at least one second processor is not associated with the remote vehicle.

In at least one embodiment, a system for collecting sensor data by a remote vehicle involves at least one processor to determine at least one scene to collect by using information in a demand map, and to configure a field of view for at least one sensor associated with the remote vehicle to collect at least one scene. The system further involves at least one sensor to collect at least one scene. In one or more embodiments, the system further involves an inventory system to store at least one scene.

The features, functions, and advantages can be achieved independently in various embodiments of the present inventions or may be combined in yet other embodiments.

DRAWINGS

These and other features, aspects, and advantages of the present disclosure will become better understood with regard to the following description, appended claims, and accompanying drawings where:

DESCRIPTION

Figure 1:
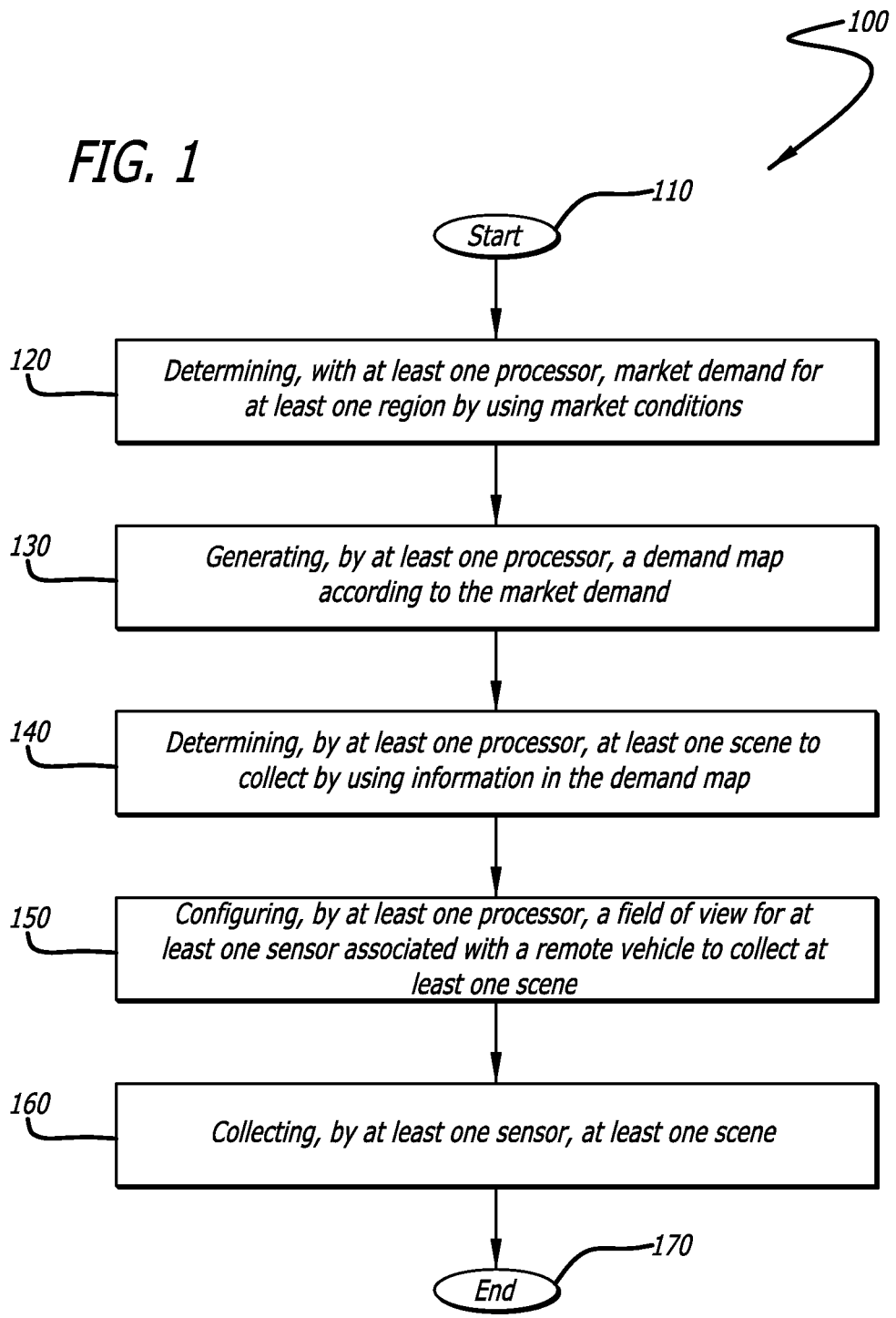
FIG. 1 is a flow diagram showing the disclosed method for demand based field of view (FOV) allocation for remote sensing systems, in accordance with at least one embodiment of the present disclosure.

The methods and apparatus disclosed herein provide an operative system for demand based field of view (FOV) allocation for remote sensing systems.

Traditionally, remote sensing data collections have been centrally planned days or weeks in advance, in response to tasking from users. A schedule is then transmitted to the remote vehicle for later collection (i.e. also known as tasking and scheduling).

With the disclosed method, the remote vehicle autonomously allocates the sensor field of view at each collection opportunity using a demand map that is updated in nearreal-time in response to market demand for sensing data. The demand map covers the entire region of interest; usually the earth, but the present disclosure also applies to space or planetary data collection. Scarcity and/or staleness of data in inventory is considered when determining market demand, thereby resulting in a time-history of data in inventory to support the change detection.

The present disclosure provides three main advantages for remote sensing systems. The first main advantage that the present disclosure provides is responsiveness to changing user needs. Responsiveness of remote sensing systems using traditional tasking and scheduling has typically been measured in weeks. Even in those systems that support emergency tasking, the information that must be transferred to the vehicle to specify the scheduled collections are large and unwieldy, sometimes taking minutes or hours to transfer. Reordering of the collections within the on-vehicle systems can be complex and time-consuming. Under the disclosed method, responsiveness to change in market demand is limited only by the availability of a communication link to the vehicle. Only changes in the demand for a specific scene need to be transmitted to the vehicle where those changes are immediately incorporated into the on-board resource allocation algorithms at the next collection opportunity.

The second main advantage that the present disclosure provides is change detection. Traditionally, remote sensing vehicle collections are only scheduled in response to an external user request. Typically, users only know that they are interested in a specific scene within the region after an event (e.g., a natural disaster, oil spill, war, etc.) has occurred. While it is the change in the scene that is of value to the users, the traditional approach limits the probability that the system will have high quality "before" data in its inventory to compare against the current data. Using the disclosed method, scarcity and/or staleness of data in inventory is considered when determining market demand and the system is continually building a library of data over the entire region, thereby increasing the probability that the "before" data will exist when needed.

The third main advantage that the present disclosure provides is efficiency. Under the traditional scheduling approach, resources are not allocated efficiently. Margin must be built into the schedules to accommodate the uncertainty of the actual versus (vs.) planned vehicle and environment states. Additional margin is often built into the schedule to accommodate late user requests, and goes unused if the late request does not materialize in time to be transferred to the vehicle. The result is that a significant percent of the system capacity to collect data is unused. Using the disclosed method, the vehicle uses sensed data in real time to estimate the vehicle and environmental state, thereby greatly reducing uncertainties and the need for margin. The sensor field of view resource is allocated at each collection opportunity, thereby ensuring that no opportunities go unused.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

FIG. 1 is a flow diagram showing the disclosed method 100 for demand based field of view (FOV) allocation for remote sensing systems, in accordance with at least one embodiment of the present disclosure. In this figure, at the start 110 of the method 100, at least one processor determines market demand for at least one region by using market conditions 120. It should be noted that market conditions are based on current news and events, user requests for data for at least one region, scarcity of data for at least one region, and/or staleness of data for at least one region. Then, at least one processor generates a demand map according to the market demand 130. At least one processor then determines at least one scene to collect by using information in the demand map 140. Then, at least one processor configures a field of view for at least one sensor associated with a remote vehicle to collect at least one scene 150. Then, at least one sensor collects at least one scene 160. Then, the method 100 ends 170.

Figure 2:
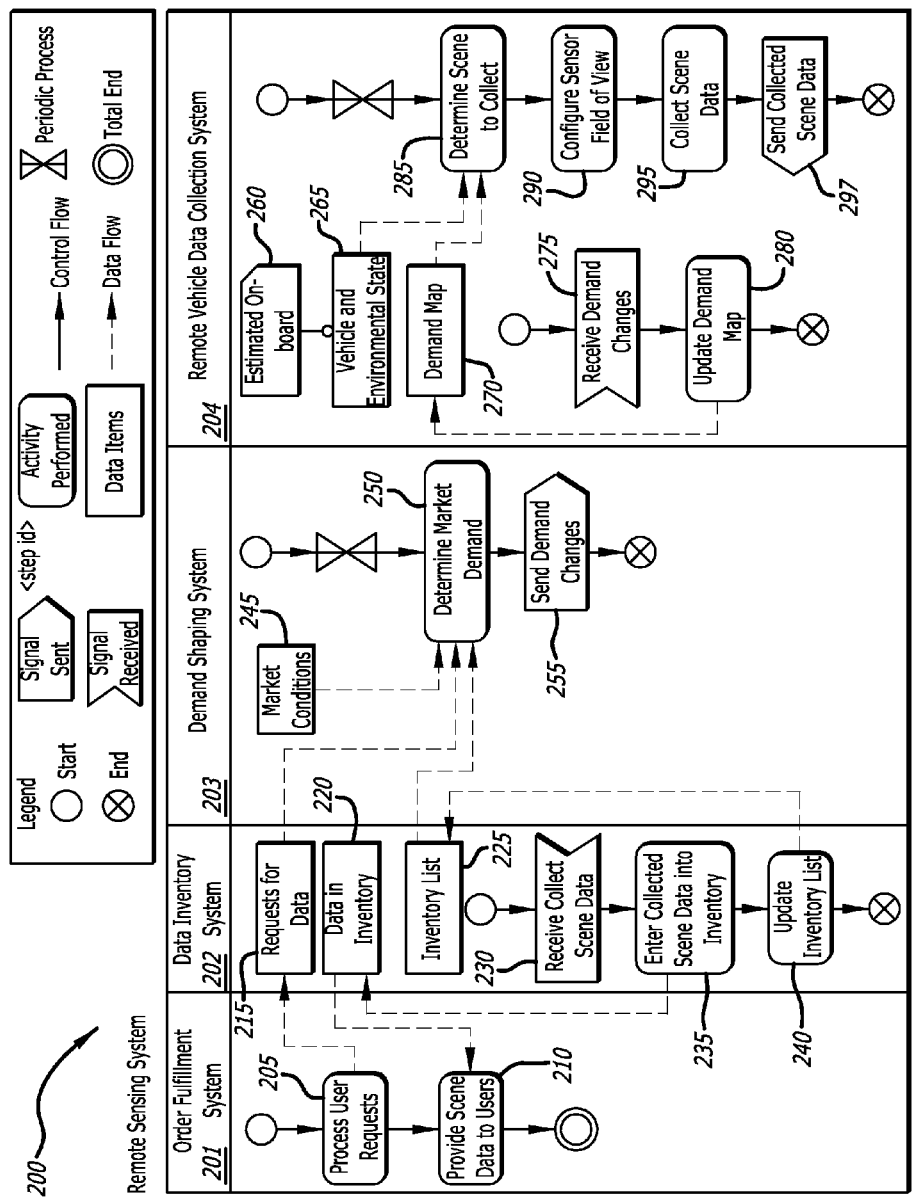
FIG. 2 is an activity diagram for the disclosed method and system for demand based field of view (FOV) allocation for remote sensing systems, in accordance with at least one embodiment of the present disclosure.

FIG. 2 is an activity diagram 200 for the disclosed method and system for demand based field of view (FOV) allocation for remote sensing systems, in accordance with at least one embodiment of the present disclosure. In this figure, the diagram 200 uses standard Unified Modeling Language (UML) nomenclature to depict the activities performed by five asynchronously executing services and the associated control, signal, and data flows.

Key elements of the present disclosure, as realized by the activity diagram 200, are (1) the Remote Vehicle 204, (2) the Order Fulfillment System 201, (3) the Data Inventory System 202, (4) the Demand Shaping System 203, and (5) the Data Collection System 204.

The Remote Vehicle 204 is any vehicle that is remote from the users, and that has data collection capability; most often a spacecraft (e.g., a satellite), aerial vehicle (e.g., a aircraft or airplane), submarine or automobile/rover. The vehicle can be manned or unmanned. Any of the systems described in diagram 200 could be hosted on computers within the remote vehicle, but the particular realization depicted in the diagram 200 assumes that only the Data Collection System 204 is "on-board" the remote vehicle.

The Order Fulfillment System 201 is the user facing portion of the present disclosure that receives and processes user requests for data and, if and/or when the requested scene is in inventory, provides it to the user.

A "scene" is defined to be a unit of data. This unit is most often geographic (such as a geographic image), but includes any partitioning of data that is defined relative to a frame of reference. Scene data includes the time and conditions under which the scene was collected, usually attached as metadata.

In this figure, the Order Fulfillment System 201 processes user requests 205, and sends them to the Data Inventory System 202. In addition, the Order Fulfillment System 201 receives data from the Data Inventory System 202, and provides the scene data to the users 210.

The Data Inventory System 202 manages the data in the inventory, maintains an up-to-date inventory list of all of the scenes that are stored in the inventory, and stores the time at which the scenes were collected.

In this figure, the Data Inventory System 202 receives user requests for data 215 from the Order Fulfillment System 201, and forwards these requests to the Demand Shaping System 203. The Data Inventory System 202 also sends data from the inventory 220 to the Order Fulfillment System 201. In addition, the Data Inventory System 202 sends an inventory list 225 to the Demand Shaping System 203.

Additionally, the Data Inventory System 202 receives the collected scene data 230. The Data Inventory System 202 then enters the collected scene data into the inventory 235, 220. Then, the Data Inventory System 202 updates the inventory list 240.

The Demand Shaping System 203 continuously determines the market demand based on at least one of the following: past, current, and projected market conditions based on current news and events; past, current, and projected user requests for data; the scarcity and/or staleness of data for a particular scene within the region of interest; and the inventory within the inventory list.

In this figure, the Demand Shaping System 203 periodically uses market conditions 245, requests for data 215, and the inventory list 225 to determine market demand 250. Then, the Demand Shaping System 203 sends the demand changes 255.

The Data Collection System 204 has two primary purposes. The first primary purpose of the Data Collection System 204 is the maintenance of a demand map. The demand map represents the market demand for each scene within the region of interest that the system is designed to collect over. The region of interest is usually the Earth or regions on the Earth, but the present disclosure also applies to space or planetary data collection. The demand map is updated based on changes in demand from the Demand Shaping System.

The second primary purpose of the Data Collection System 204 is the collection of scene data. For each collection opportunity, the Data Collection System 204 determines which scene to collect, configures the sensor field of view, collects the scene data, and sends the scene data to the Data Inventory System 202. Determining which scene to collect is accomplished by using a resource allocation algorithm that allocates the sensor field of view to a specific scene as a function of both demand value and cost to collect the scene. The cost of collection includes, but is not limited to, the required power, required time, required data storage, and/or required bandwidth needed for transmission. The allocation may be constrained by the current state of the vehicle and/or the state of the vehicle's environment. A collection opportunity exists whenever the region of interest is within the field of regard of the vehicle's sensor. The "field of regard" is defined as the range of all possible sensor fields of view that could be configured at that instant in time.

In this figure, the Remote Vehicle Data Collection System 204 estimates on-board 260 the vehicle and environmental state 265. Also, the Remote Vehicle Data Collection System 204 receives demand changes 275. The Remote Vehicle Data Collection System 204 uses the received demand changes to update the demand map 280, 270.

In addition, the Remote Vehicle Data Collection System 204 periodically uses the estimated vehicle and environmental state 265 and information from the demand map 270 to determine which scene(s) to collect 285. Then, the Remote Vehicle Data Collection System 204 configures at least one sensor's field of view 290. The Remote Vehicle Data Collection System 204 then has the sensor(s) collect the scene data 295. Then, the Remote Vehicle Data Collection System 204 sends the collected scene data 297.

Figure 3:
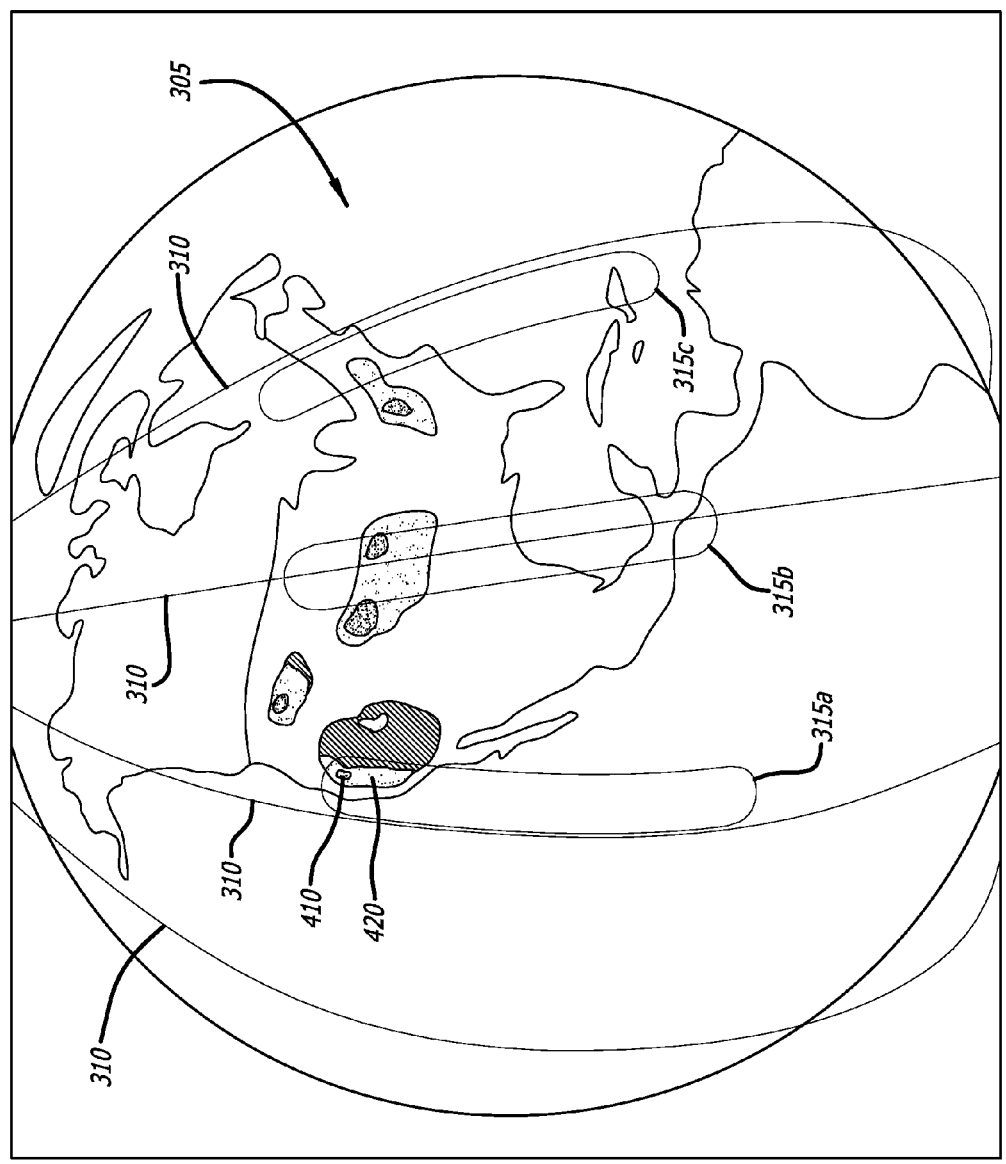
FIG. 3 depicts an exemplary demand map for the disclosed method and system for demand based field of view (FOV) allocation for remote sensing systems, in accordance with at least one embodiment of the present disclosure.

FIG. 3 depicts an exemplary demand map 300 for the disclosed method and system for demand based field of view (FOV) allocation for remote sensing systems, in accordance with at least one embodiment of the present disclosure. In this figure, the orbital path 310 around Earth 305 of a satellite (i.e. a remote vehicle), which contains at least one sensor, is shown. Also, three sensing regions 315a, 315b, 315c that lie along the orbital path 310 are shown. These sensing regions 315a, 315b, 315c each show an area of the orbital path 310 where sensing occurs.

In addition, regions over the United States land mass are designated with demand priorities; where priority 1 designates a high priority region (i.e. a region with a high demand for images), priority 2 designates a medium priority region, and priority 3 designates lower priority region (i.e. a region with a lower demand for images). For example, region 410 is a priority 1 region, and region 420 is a priority 2 region.

Figure 4:
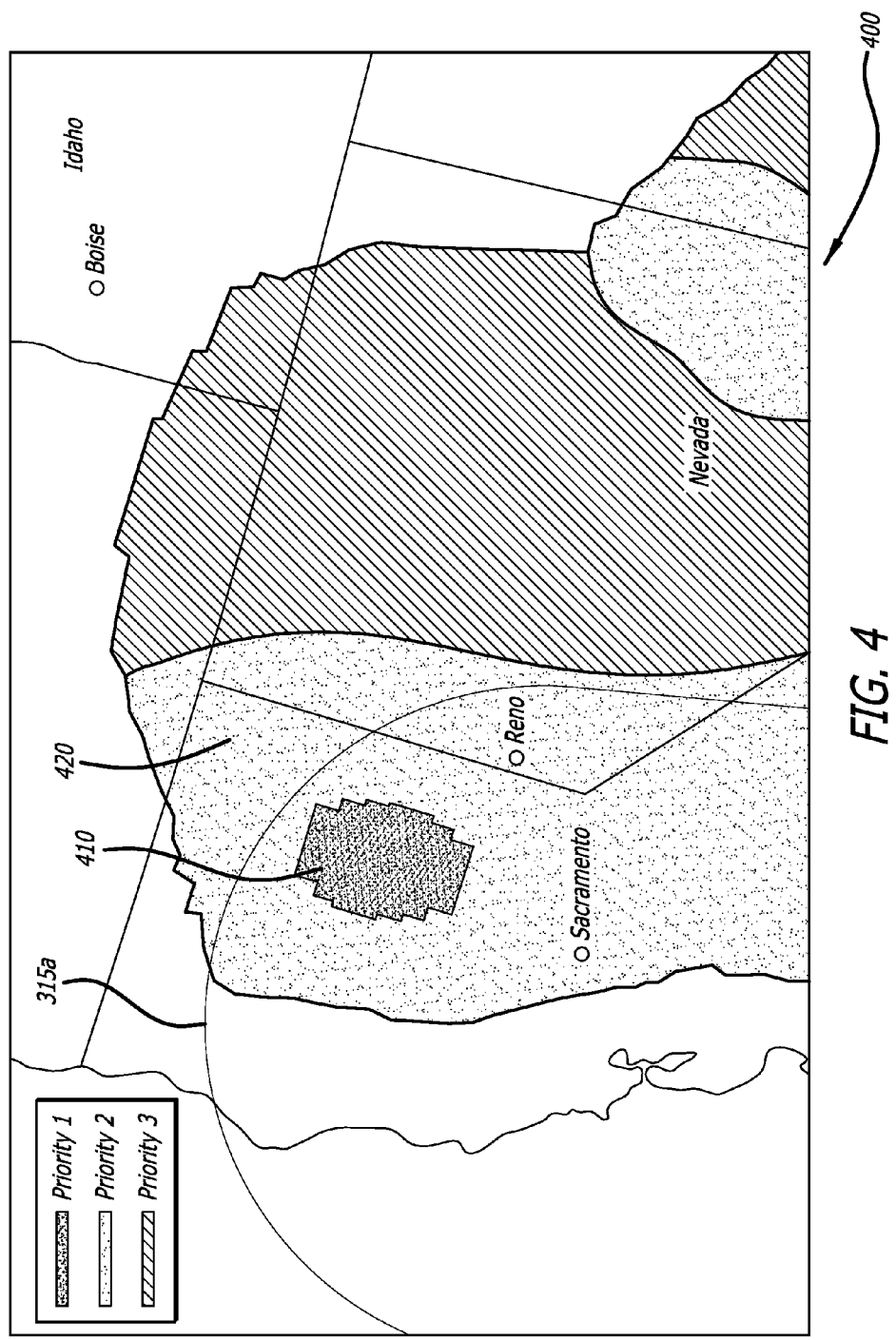
FIG. 4 shows a close-up view of a portion of the demand map of FIG. 3, in accordance with at least one embodiment of the present disclosure.

FIG. 4 shows a close-up view 400 of a portion of the demand map 300 of FIG. 3, in accordance with at least one embodiment of the present disclosure. In this figure, a close-up view 400 of region 410, region 420, and the upper part of sensing region 315a is shown.

Figure 5:
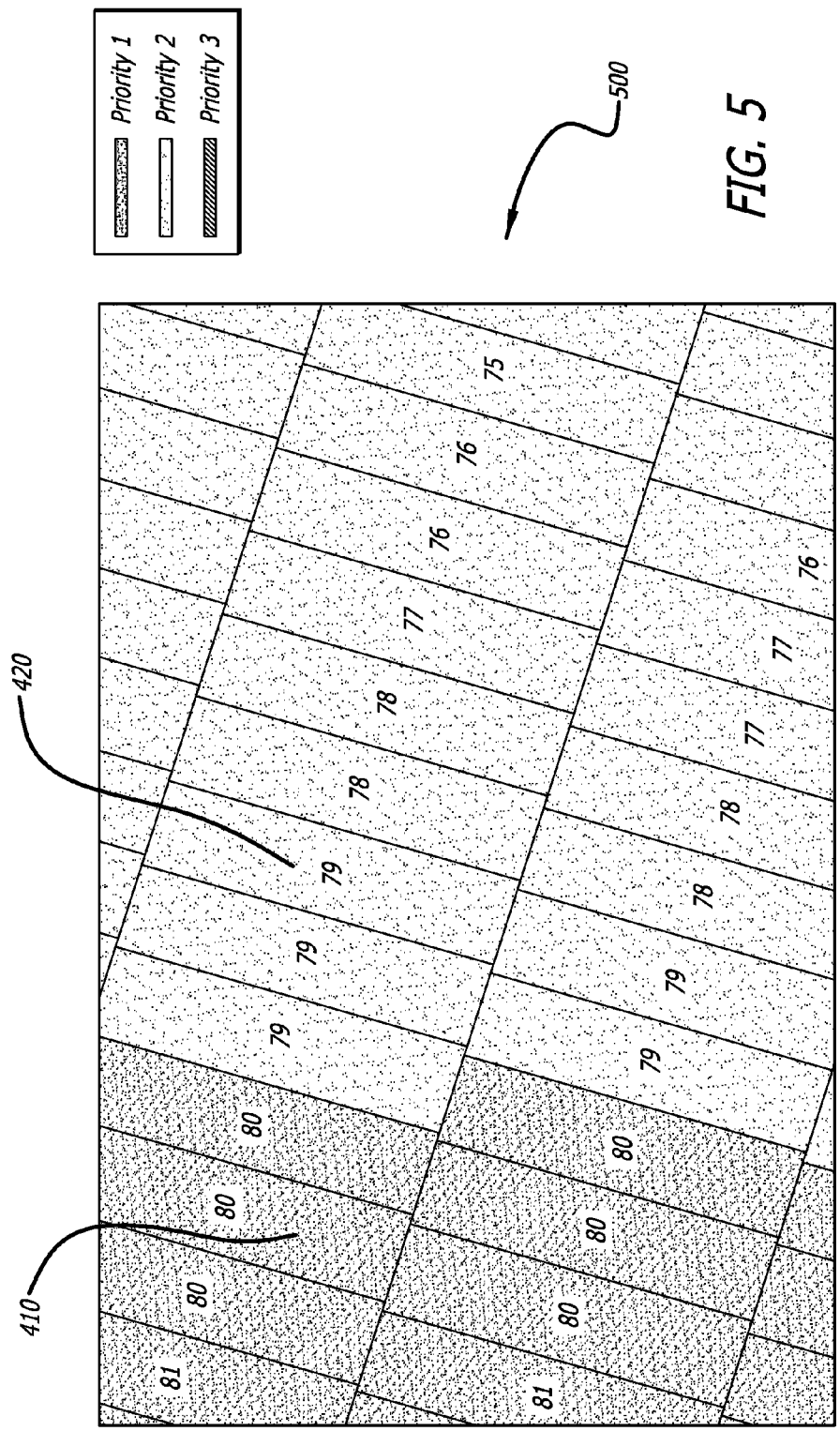
FIG. 5 illustrates a close-up view of a portion of the view shown in FIG. 4, in accordance with at least one embodiment of the present disclosure.

FIG. 5 illustrates a close-up view 500 of a portion of the view 400 shown in FIG. 4, in accordance with at least one embodiment of the present disclosure. In this figure, a close-up view 500 of region 410 and region 420 is shown. In addition, this figure shows how the regions (e.g., region 410 and 420) of the demand map 300 are each divided into a number of elements. In this figure, the elements are numbered 75-81, and are of a rectangular shape. Various different shapes may be used for the elements including, but not limited to, rectangular, square, and hexagonal.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

I claim:

1. A method for collecting sensor data by a remote vehicle, the method comprising:

generating, by one of at least one first processor or at least one second processor, a demand map according to market demand, wherein the demand map comprises a plurality of regions of demand for the sensor data;

determining, by the at least one first processor, at each collection opportunity, which is when at least one of the regions of demand is within a field of regard of at least one sensor associated with the remote vehicle, at least one scene to collect by autonomously allocating a field of view for the at least one sensor associated with the remote vehicle to the at least one scene: (1) by using information in the demand map, which is updated in response to the market demand for the sensor data by continuously determining the market demand, and (2) by using a cost to collect the at least one scene related to a collection capacity of the remote vehicle ensuring that no collection opportunities go unused;

configuring, by the at least one first processor, the field of view for the at least one sensor associated with the remote vehicle to collect the at least one scene; and collecting, by the at least one sensor, the at least one scene.

2. The method of claim 1, wherein the at least one scene comprises image data for at least one of the regions.

3. The method of claim 1, wherein the remote vehicle is one of a manned vehicle and an unmanned vehicle.

4. The method of claim 1, wherein the remote vehicle is one of an airborne vehicle, a terrestrial vehicle, and a marine vehicle.

5. The method of claim 4, wherein the airborne vehicle is one of a satellite, a pseudo satellite, a space plane, an aircraft, a helicopter, and an airplane.

6. The method of claim 4, wherein the terrestrial vehicle is one of an automobile, a rover, and a train.

7. The method of claim 4, wherein the marine vehicle is one of a submarine, a ship, and a boat.

8. The method of claim 1, wherein the at least one first processor is associated with the remote vehicle.

9. The method of claim 1, wherein the information in the demand map is related to market demand for at least one of the regions.

10. The method of claim 1, wherein the method further comprises determining, with the at least one first processor, the market demand by using the market conditions,
wherein the market conditions are based on at least one of current news and events, user requests for data for at least one of the regions, scarcity of data for at least one region, and staleness of data for at least one region.

11. The method of claim 1, wherein the method further comprises sending the at least one scene to an inventory system.

12. The method of claim 11, wherein the method further comprises:
determining, by the at least one first processor, the market demand for data for at least one of the regions by reviewing contents of the inventory system;
updating, by the at least one first processor, the demand map according to the market demand when the at least one first processor determines that data for the at least one of the regions contained in the inventory system is older than a threshold period of time.

13. The method of claim 11, wherein the method further comprises:
determining, by the at least one first processor, the market demand for data for at least one of the regions by reviewing contents of the inventory system;
updating, by the at least one first processor, the demand map according to the market demand when the at least one first processor determines that data for the at least one of the regions is not contained in the inventory system.

14. The method of claim 1, wherein the method further comprises receiving, by the remote vehicle, the demand map.

15. The method of claim 1, wherein the at least one second processor is external to the remote vehicle.

16. A system for collecting sensor data by a remote vehicle, the system comprising:
at least one processor to generate a demand map according to market demand, wherein the demand map comprises a plurality of regions of demand for the sensor data; to determine at each collection opportunity, which is when at least one of the regions of demand is within a field of regard of at least one sensor associated with the remote vehicle, at least one scene to collect by autonomously allocating a field of view for the at least one sensor associated with the remote vehicle to the at least one scene: (1) by using information in the demand map, which is updated in response to the market demand for the sensor data by continuously determining the market demand, and (2) by using a cost to collect the at least one scene related to a collection capacity of the remote vehicle ensuring that no collection opportunities go unused; and to configure the field of view for the at least one sensor associated with the remote vehicle to collect the at least one scene; and the at least one sensor to collect the at least one scene.

17. The system of claim 16, wherein the at least one scene comprises image data for at least one of the regions.

18. The system of claim 16, wherein the system further comprises an inventory system to store the at least one scene.

19. The method of claim 1, wherein the plurality of regions comprise different priority levels of demand for images.

20. The method of claim 1, wherein the determining of the at least one scene to collect comprises autonomously allocating, by the remote vehicle, sensor resources by using the information in the demand map.

21. The method of claim 1, wherein the cost to collect the at least one scene comprises at least one of required power, required time, required data storage, or required bandwidth needed for transmission.

* * * * *